No. 643,078. Patented Feb. 6, 1900.
F. F. ANDERSON.
MOTOR.
(Application filed Apr. 17, 1899.)

(No Model.) 2 Sheets—Sheet 1.

Witnesses:
M. R. Reinly
H. C. Rodgers.

Inventor:
F. F. Anderson
By Higdon, Fischer & Thorpe
Attys.

THE NORRIS PETERS CO., PHOTO-LITHO., WASHINGTON, D. C.

No. 643,078. Patented Feb. 6, 1900.
F. F. ANDERSON.
MOTOR.
(Application filed Apr. 17, 1899.)
(No Model.) 2 Sheets—Sheet 2.

Witnesses:
M. R. Remley
H. C. Rodgers

Inventor:
F. F. Anderson
By Higdon, Fischer & Thorpe
attys.

THE NORRIS PETERS CO., PHOTO-LITHO., WASHINGTON, D. C.

United States Patent Office.

FREDERICK F. ANDERSON, OF NEW YORK, N. Y., ASSIGNOR OF FIFTY-ONE ONE-HUNDREDTHS TO EMANUEL BLOCH, OF CHICAGO, ILLINOIS.

MOTOR.

SPECIFICATION forming part of Letters Patent No. 643,078, dated February 6, 1900.

Application filed April 17, 1899. Serial No. 713,423. (No model.)

*To all whom it may concern:*

Be it known that I, FREDERICK F. ANDERSON, of New York, county of New York, and State of New York, have invented certain new and useful Improvements in Motors, of which the following is a specification.

My invention relates to motors for operating fans, sewing-machines, and other objects which can be operated with light power; and my object is to produce a device of this character, to be sold at a figure within the means of practically every household, which will serve as a practical substitute for electric, steam, or air power, forces which can be utilized by a relatively small number of people.

A further object is to produce a spring-motor, which will run for a long period of time without the necessity of being rewound, of simple, strong, durable, and inexpensive construction.

The invention consists, essentially, of a plurality of wheels, springs secured thereto, and dogs for engagement with said wheels to prevent their rotation, a shaft geared to the shaft of said wheels and adapted to impart motion to a fan or other object, and automatic means for successively tripping said dogs and thereby utilizing successively the power of said springs to drive the fan or other object, said automatic release tripping one dog just before the power of the preceding spring is exhausted.

The invention further consists in certain novel and peculiar features of construction and combinations of parts, as will be hereinafter described and claimed, and in order that it may be fully understood reference is to be had to the accompanying drawings, in which—

Figure 1:
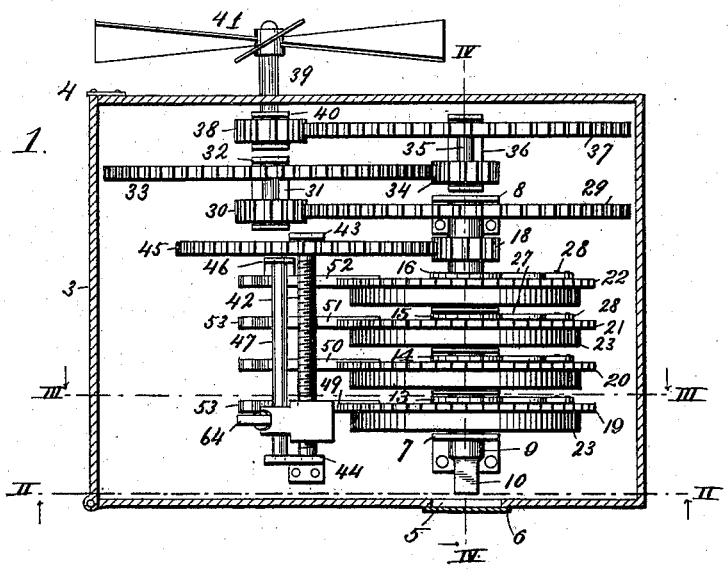
Figure 2:
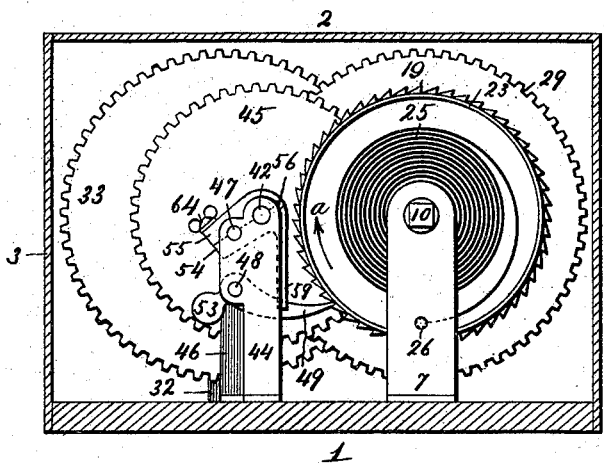
Figure 3:
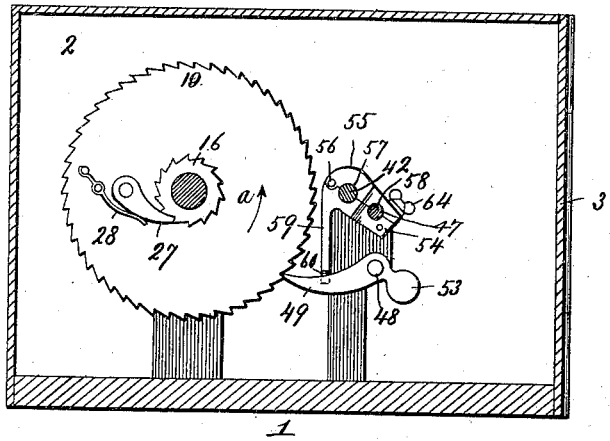
Figure 4:
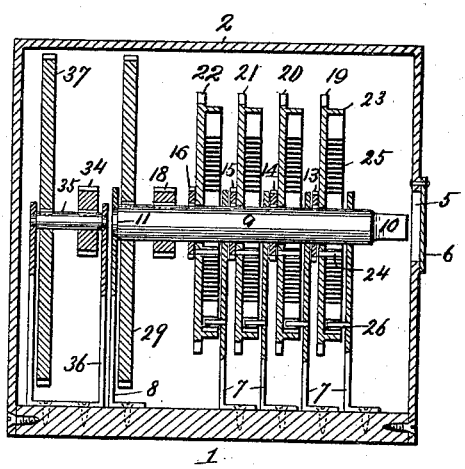
Figure 5:
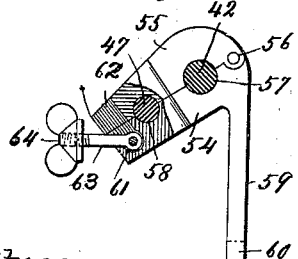
Figure 6:
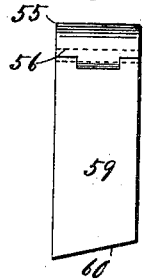

Figure 1 represents a horizontal section of the casing containing a spring-motor embodying my invention. Fig. 2 is a vertical section taken on the line II II of Fig. 1. Fig. 3 is a vertical section taken on the line III III of Fig. 4. Fig. 4 is a vertical section taken on the line IV IV of Fig. 1. Fig. 5 is an enlarged view, partly broken away, of the automatic release, the feed-screw and guide-rod on which said release is mounted and travels being shown in section. Fig. 6 is a view of the same, showing the face of its trip-arm.

In said drawings, 1 designates the base upon which the casing 2, preferably of rectangular form, is mounted, said casing being open at one end and provided with a hinged door 3 and a catch 4 to hold the door normally closed. In one side it is also provided with an opening 5, normally closed by a pivoted shutter or plate 6. Opposite said shutter a series of parallel standards 7 are secured to the base, and in alinement with said series is a similar standard 8.

9 designates a shaft journaled in said standards, one end being formed rectangular, as at 10, for convenient engagement with a wrench or key (not shown, but adapted to be introduced through the opening 5) and the other end diametrically reduced to form the shoulder 11, which bears against the standard 8 and prevents the shaft creeping in that direction.

13, 14, 15, and 16 designate small ratchet-wheels, which are keyed or otherwise rigidly secured upon the shaft 9, and 18 a small gear-pinion, which is also keyed upon said shaft at a point between ratchet-wheel 16 and the standard 8.

19, 20, 21, and 22 designate ratchet-wheels journaled upon the shaft between the standards 7 and the ratchet-wheels 13, 14, 15, and 16, respectively, and each of said wheels is provided with a circular flange 23 and a pin 24, and inclosed by said flanges and secured at their inner ends to the pins 24 are the barrel-springs 25, the outer ends of said springs being secured to the pins 26, projecting from standards 7. To prevent said springs revolving said wheels at inopportune times, each wheel carries a pivoted dog 27 for engagement with its respective or companion ratchet-wheel 13, 14, 15, or 16, and said dogs are held in engagement with said ratchets by the springs 28, also carried by said wheels, (see Fig. 3,) it being noticed in this connection that the teeth of the ratchet-wheels keyed to the shaft are disposed oppositely to the teeth of the ratchet-wheels journaled upon said shaft, the latter, when operated by the power of the springs, turning in the direction indicated by the arrows *a*, Figs. 2 and 3, and under the power of the shaft through the medium of a key or wrench in the direction opposite to that indicated by said arrows, this movement of the shaft being imparted to said wheels successively by reason of the engagement of the keyed ratchets with the dogs carried by the journaled ratchet-wheels, as will be readily understood by reference to Fig. 3.

Keyed upon the shaft 9 adjacent to the standard 8 is a large cog-wheel 29, which meshes continuously with a small cog-wheel 30, keyed upon a short shaft 31, journaled in a U-shaped standard 32, and said shaft also carries rigidly a large cog-wheel 33, meshing continuously with a small cog-wheel 34, keyed upon a short shaft 35, which shaft is journaled in a U-shaped standard 36 and carries a large cog-wheel 37, meshing continuously with a small cog-wheel 38, journaled upon a short shaft 39, projecting through the casing and journaled in a U-shaped standard 40 within the latter, this shaft in practice being adapted to impart motion to a fan 41, mounted thereon or otherwise geared thereto or to a sewing-machine, churn, or other device requiring only a comparatively light power to operate it.

By the gearing interposed between the drive-shaft 9 and the shaft 39 it is obvious that the exceedingly slow movement of the former, as hereinafter referred to, is transformed into the exceedingly rapid rotation of the latter.

In order to utilize the power of the springs 25 singly or successively, I employ a mechanism constructed as follows: 42 designates a feed-screw extending parallel with shaft 9 and journaled at its opposite ends in the bearing-standards 43 44, secured to the casing, and 45 a large cog-wheel keyed thereon and meshing continuously with the gear-pinion 18 of shaft 9, so that the rotation of said shaft shall impart relatively slow rotation to said feed-screw. Arranged forward of the cog-wheel 45 is a bearing-standard 46, and secured at its opposite ends in said standard 46 and standard 44 and parallel with and adjacent to the feed-screw is a guide-rod 47, and vertically below said guide-rod and also connecting said standards is a pivot-rod 48, upon which are pivoted at proper intervals the dogs 49, 50, 51, and 52 for engagement, respectively, with the journaled ratchet-wheels 19, 20, 21, and 22, said dogs being held yieldingly in the path of said wheels by weighting their opposite ends, as at 53, though it is obvious that the mechanical equivalent of this construction will perform the function of holding the dogs yieldingly in engagement with the wheels. In order to trip said dogs successively, I provide a traveling release consisting of the lower member 54 and the upper member 55, pivoted together at one end, as shown at 56, and adjacent to said pivot or hinge point provided with registering notches which conjointly form a threaded opening 57, engaging the feed-screw 42, said members being provided also with registering notches which conjointly form the circular opening 58, through which the guide-rod 47 extends, this guide-rod serving to prevent the release oscillating upon the screw, and thereby holding the depending trip-arm 59 perfectly rigid, said trip-arm being provided with a bevel or cam face 60 at its lower end, which is adapted under the movement of the release upon the feed-screw to successively engage the upper sides of the dogs 49, 50, 51, and 52 and force them out of engagement with the wheels 19, 20, 21, and 22, the release traversing rearward toward the wheel 45 under the rotation of the screw in the threaded opening 57, as will be readily understood. To make this traveling movement from front to rear of the release absolutely positive and reliable, however, it is necessary to clamp the members of the release together, and this I accomplish in a simple and inexpensive manner by providing the members with registering notches 61 62 and pivoting in notch 61 the bolt 63, carrying at its outer end a clamping-nut 64, so that when the bolt is swung upward into the registering notch 62 a turn or two of the nut will cause it to bear upon the upper side of member 55, and thereby hold said members reliably together.

Supposing the springs to be unwound and the release consequently occupying a position adjacent to the cog-wheel 45, it is necessary before rewinding the springs to unscrew the nut 64 and throw it from the position shown in Fig. 2 to the position shown in Fig. 5. When this is done, the operator can pivotally open the release a sufficient distance to permit it to be slid freely back to its original position at the front end of the screw, as shown in Fig. 1, and then the members are clamped together again, as before. A key or lever is now introduced through the opening 5 and engaged with the squared end of the power-shaft and the latter turned in the direction opposite to that indicated by the arrows, which action collectively rewinds and restores the power of the springs 25, the keyed ratchet-wheels 16 in this operation imparting movement, through the medium of the spring-actuated dogs 27, to the journaled ratchet-wheels secured to the inner ends of the springs, while the gravity-dogs 49, 50, 51, and 52 prevent the springs from unwinding.

If it is desired that the motor shall begin to operate as soon as the winding operation ceases, the release should be positioned so that the first dog 49 shall be depressed or tripped by said release, and thereby offer no opposition to the rotation of the wheel 19 under the action of its spring at the instant the winding operation is completed; but if it be desired to so construct the machine that it may remain inoperative after being wound up the release should be adjusted to a point forward of said dog 49. In this latter case, however, when it is desired to start the motor it will be necessary to trip the dog 49 by hand and hold it in such position until the screw has been rotated sufficiently to dispose the trip-arm of the release in the path of the dog, said release of course moving rearwardly at an exceedingly low rate of speed, the rate of speed of course being proportionate to the length of time which the spring 25 will operate, so that just before the power of the first spring is exhausted said release will have moved rearward upon the feed-screw a sufficient distance to trip the second dog 50, holding the second spring 25 in check, to the end that said second spring shall take the load off the first spring and keep the motor in operation until the release reaches and trips the third dog 51 and releases the third spring, these operations being repeated until all of the dogs have been tripped and the last spring is "dead" or exhausted.

The drawings and description of course refer only to a limited number of springs and companion parts; but it is obvious that any desired number may be employed and that an increase in the number of course means an increase in the length of time which the motor will run without the necessity of rewinding it.

From the above description it will be apparent that I have produced a spring-motor which embodies the features of advantage enumerated as desirable in the statement of invention, and it will be understood that while I have shown and described the preferred embodiment of my invention I reserve the right to make such changes as properly fall within the spirit and scope of the invention.

Having thus described the invention, what I claim as new, and desire to secure by Letters Patent, is—

1. A motor, comprising a shaft, a wheel thereon, a feed-screw geared to said wheel, a guide-rod, a dog engaging said wheel, a release mounted upon said feed-screw and said rod and adapted to be moved by the former to trip the said dog, said release comprising a lower member having a trip-arm to engage the dog, an upper member pivoted to the lower member, means to clamp said members upon said feed-screw and rod, and means to rotate said wheel and thereby said feed-screw after the dog is tripped, substantially as described.

2. A motor, comprising a shaft, a ratchet-wheel rigid thereon, a spring-rotated wheel journaled on the shaft and provided with a dog engaging the ratchet-wheel, a pivoted dog engaging the journaled wheel to restrain the spring, a rotatable screw geared to said shaft, a guide-rod parallel with the screw, and a traveling release mounted on the screw and guide-rod, and consisting of two sections clamped together and against opposite sides of the screw and rod, one of the sections having a beveled end to engage and trip the spring-restraining dog, substantially as described.

3. A motor comprising a shaft, a wheel thereon, a feed-screw geared to said wheel, a guide-rod, a dog engaging said wheel, a release mounted upon said feed-screw and said rod and adapted to be moved by the former to trip said dog, said release consisting of a lower member having a trip-arm to engage the dog and a pivoted bolt carrying a clamping-nut, and an upper member hinged to the lower member and provided with a notch in its free end to receive said clamping-bolt and be secured by the nut to the lower member, and means to rotate said wheel and thereby said feed-screw after the dog is tripped, substantially as described.

4. A motor, comprising a suitable casing, having a shutter-closed opening, a series of standards having pins, a shaft journaled in said standards and provided with a squared end adjacent to said opening, a series of ratchet-wheels rigid on said shaft, a series of toothed wheels journaled on the shaft and provided with spring-actuated dogs engaging said ratchet-wheels, and with a series of pins, a series of coiled springs secured at their opposite ends to the pins of the wheels and standards, a pivoted dog engaging each journaled wheel, a screw geared to the shaft, a guide-rod parallel with the screw, and a traveling release mounted upon the screw and rod and provided with a pendent trip-arm 59, to successively trip said pivoted dogs, substantially as described.

In testimony whereof I affix my signature in the presence of two witnesses.

FREDERICK F. ANDERSON.

Witnesses:
   JAMES J. THORNLEY, Jr.,
   ED. A. STERN.